United States Patent [19]

Emerson

[11] 4,119,327
[45] Oct. 10, 1978

[54] LEVER FOR MOTORCYCLE CENTER STAND

[75] Inventor: Donald E. Emerson, Palmdale, Calif.

[73] Assignee: Space-Age Control, Inc., Palmdale, Calif.

[21] Appl. No.: 815,291

[22] Filed: Jul. 13, 1977

[51] Int. Cl.$^2$ ............................................. B62H 1/00
[52] U.S. Cl. ..................................... 280/302; 280/293
[58] Field of Search ............... 280/295, 301, 302, 303, 280/293; 180/31

[56] References Cited

U.S. PATENT DOCUMENTS

| | | | |
|---|---|---|---|
| 1,172,465 | 2/1916 | Knapp | 280/302 |
| 1,215,606 | 2/1917 | Anderson et al. | 280/302 |

Primary Examiner—Joseph F. Peters, Jr.
Assistant Examiner—Donn McGiehan
Attorney, Agent, or Firm—Huebner & Worrel

[57] ABSTRACT

A device for increasing the leverage on a motorcycle center stand to position it to support a motorcycle vertically. The center stand is pivotally secured to the motorcycle main frame and is formed of laterally spaced legs adapted to support the motorcycle on their lower ends in an at rest position. Upper end portions of the legs are pivotally mounted to the frame, the stand being normally spring biased on the pivot mounting in the upwardly non-functional position. A side arm on the stand extends outwardly of the motorcycle in the non-functional position and is adapted to move the stand downwardly against the force of the spring to a rearwardly-vertical position and then past the pivot center to a forwardly-vertical position against the weight of the motorcycle to raise the motorcycle to a steady at rest position with the lower ends of the stand legs on the ground surface under the motorcycle. There is a foot pad on the side arm adjacent its outer end on which force is to be applied to move the arm and stand to the at rest position. The device is a lever securable to the arm adjacent its outer end and by which substantially additional force can be applied to the pad and the arm to move the stand past the pivot center to the at rest position.

9 Claims, 4 Drawing Figures

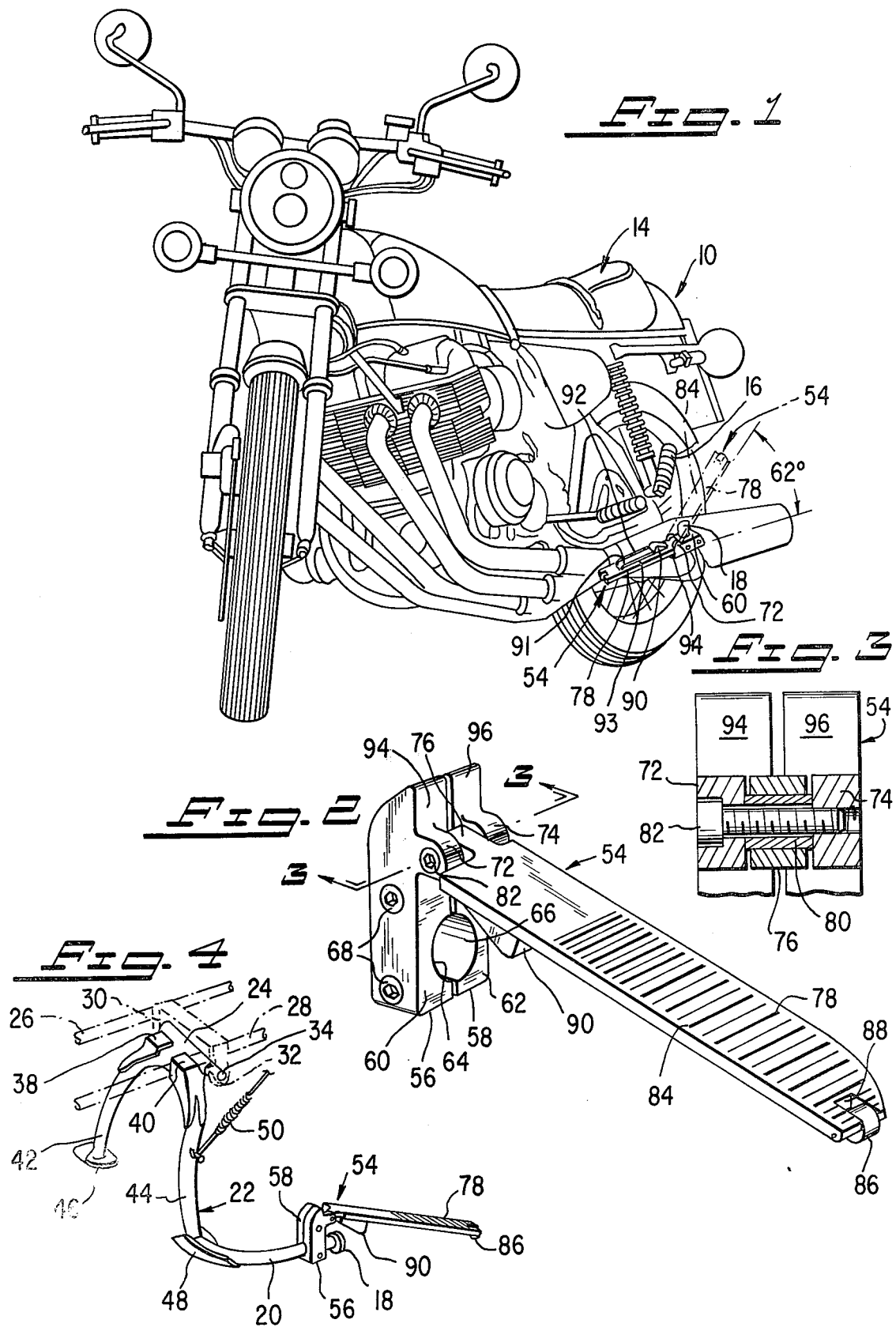

LEVER FOR MOTORCYCLE CENTER STAND

BACKGROUND OF THE INVENTION

Motorcycles are generally provided with side stands which are satisfactory for temporary use but provide the disadvantage of permitting oil to run into the pistons on the side toward which the motorcycle is leaning on the side stand. In addition, motorcycles are provided with center stands to hold them in an at rest vertical position, generally with the rear wheel off the ground.

Because the present day motorcycles are heavier than the prior motocycles, it has become increasingly difficult to operate the center stands; that is, to lower them to the ground to support the motorcycle in a vertical at rest position. Typical center stands are formed of two spaced legs pivotally mounted on the motorcycle main frame, and are held in an upper non-functional position by a spring connected at one end to one of the legs and at its other end to the frame. Pads are fitted adjacent the lower end of the legs to provide wider area of support for the motorcycle when the center stand is in the supporting position.

Typical center stands have a side arm extending outwardly from one of the legs adjacent to a portion of the leg and which is adapted to be near the ground when the stand supports the motorcycle. The arm extends outwardly of the frame and motorcycle in the non-functional position so as to be generally vertically upwardly at approximate right angles to the legs. At the top of the arm is a pad on which an operator's foot is positioned and downward force is applied with the foot to move the stand downwardly to a rearwardly-vertical position against the force of the spring. When this has been done the legs are in contact with the ground surface but are not in position to support the motorcycle. Because of the very substantial weight of the modern motorcycles, it is very difficult to move the legs by force on the pad beyond the pivot center of the stand to a forwardly-vertical position at which the motorcycle is supported vertically and solidly by the center stand. Thus, in order to overcome the weight of the motorcycle to complete the last movement of the stand, the operator must lift the motorcycle while he maintains pressure on the foot pad to move the stand forwardly to the desired position.

Because of the substantial weight that must be lifted in the last part of the aforesaid operation, an inordinate amount of strength is required to position the center stand so as to properly support the motorcycle thereon.

SUMMARY OF THE INVENTION

To overcome the above problem, according to the invention, a device has been provided to increase the leverage on the foot pad of the center stand so that the modern heavy motorcycle can be easily raised to be supported on its center stand.

Accordingly, it is an object of the present invention to provide an improved lever means for lowering a center stand of a motorcycle and raising the motorcycle on it so that the stand holds the motorcycle in a vertical, raised at rest position.

It is another object of the present invention to provide an improved lever means, as described in the preceding paragraph, which is positionable in an out-of-way non-functional position when not in use. The lever is adapted to be pivoted out of its operating position to a forward position where it is maintained out of the way during travel, and particularly so as not to interfere with a passenger's foot support or saddle bags on the rear of the motorcycle.

It is another object of the invention to provide a lever, as described in the preceding paragraphs, which has a thickened portion adapted to engage the foot pad on the stand side arm so as to raise the lever and increase the downward leverage movement available when raising the motorcycle to be supported on the center stand.

It is a further object of the present invention to provide a roller means on the rear end on the lever, as described in the previous paragraph, which is adapted to make contact with the ground surface as the motorcycle is being raised to be supported on the center stand. This roller permits movement of the rear end of the lever on the ground surface without causing wear to the lever itself and prevents the lever from digging into and catching on the ground surface.

Further objects and advantages of the invention may be brought out in the following part of the specification wherein small details have been described for the competence of disclosure without intending to limit the scope of the invention which is set forth in the appended claims.

BRIEF DESCRIPTION OF THE DRAWINGS

Referring to the accompanying drawings, which are for illustrative purposes:

FIG. 1 is a perspective view of a motorcycle including the present invention;

FIG. 2 is a perspective view of the lever according to the invention which is adapted to be attached to the motorcycle center stand;

FIG. 3 is a fragmentary cross-sectional view, taken along the lines 3—3 of FIG. 2; and FIG. 4 is a perspective view of a motorcycle center stand in its supporting position, and illustrating the attachment thereto of the lever according to the invention.

DESCRIPTION OF THE PREFERRED EMBODIMENT

Referring again to the drawings, there is shown in FIG. 1 a modern heavy motorcycle, generally designated as 10. The motocycle is generally supported by a main frame, not shown in detail, and in addition to a driver's seat, has a seating area, generally designated as 14, for a passenger. Under the passenger's seating area are pivotally mounted passenger foot rests 16, one being on each side. The foot rest 16 is shown in the upper and stowed position. However, when it is used to receive a passenger's foot, it extends horizontally outwardly so as to be in the general area of, and vertically above, a pad 18 on a side arm 20, FIG. 4, of a motorcycle center stand, generally designated as 22.

The center stand 22 is comprised of an upper sleeve 24 extending horizontally adjacent two members 26 and 28 of the motorcycle main frame. The sleeve 24 is pivotally supported between two downwardly extending ears 30 and 32 connected to the frame members 26 and 28 by means of a pin 34 which is secured in the ears and extends through the sleeve to permit the center stand to be pivoted thereon.

Extending downwardly from the sleeve are supporting structural members 38 and 40 which have upper flat surfaces adapted to make supporting contact with frame portions, not shown, when the stand is in the supporting position. Extending downwardly from each of the members 38 and 40 are laterally spaced legs 42 and 44, respectively. The legs have pads 46 and 48 at their respective bottoms to rest on the ground surface when supporting the motorcycle. In the FIG. 4, the stand is shown with the legs in forwardly-vertical position moved past the pivot center, to support the motorcycle in its stable, at rest vertical position.

When the center stand 22 is in its retracted nonfunctional position, the pad 18 on the arm 20 is as shown in FIG. 1, and the arm 20 extends generally vertically, the legs 42 and 44 being generally horizontal as they are held by the spring 50, FIG. 4, having one end attached to a leg and the other end attached to the frame.

During normal operation, without the use of the present invention, when the motocycle is to be supported vertically on the center stand, the operator places his foot on the top of the pad 18 which forces the stand 22 downwardly against the force of the spring 50 to a rearwardly-vertical position with the pads 46 and 48 in contact in non-supporting position with the ground surface. Then in order to move the legs to a forwardly-vertical position in which they will support the motorcycle in a vertical at rest position, substantially more force must be applied to the pad 18 and the motorcycle must be lifted upwardly at the rear end by the operator so as to permit the stand to move past the center of the pivot, that is, to move the legs from the rearwardly-vertical position to the forwardly-vertical position where they hold the motorcycle securely in the at rest position.

In order to overcome the great force needed on the foot pad 18 and to eliminate the hand lifting in addition to that, a lever mechanism, generally designated as 54, has been provided, as best seen in FIG. 2. The device is comprised of two clamping members 56 and 58 which have flat upper surfaces 60 and 62 when attached to the arm 20, and it is in its upper position, as shown in FIG. 1. The clamping members have facing semicircular cut-a-way portions 64 and 66 in which the arm 20 is adapted to be fitted and secured by means of Allen bolts 68.

As shown in FIGS. 1–4, spaced forward, in FIG. 1, of the bolts 68 are two spaced flanges 72 and 74 extending upwardly from the faces 60 and 62, respectively. The space between the flanges is adapted to receive a hinge 76 at one end of a lever member 78. The hinge 76 has a sleeve bearing 80 fitted therein and the bearing and hinge are secured between the flanges 72 and 74 by an Allen bolt 82 threadedly engaged in the flange 74. The bolt tightens the sleeve bearing between the flanges so that the hinge 76 is pivotal on the bearing.

On its upper side the lever member 78 is serrated at 84 to receive an operator's foot in the position shown in phantom outline in FIG. 1. At the rear end, FIGS. 1 and 4, of the lever member is a roller 86 mounted for rotation in a slot 88. The roller extends below and rearwardly of the member 78.

As best seen in FIGS. 1 and 4, a thickening member 90 extends from the underside of the member 78 so as to make contact with the pad 18 when the lever is in the operating position, shown in FIG. 1. Between the thickening member 90 and the roller 86 on the underside is a recess 91 spacing two strengthening ribs 92 and 93. The member 90 is provided to raise the lever to obtain the best leverage angle so that the greatest leverage can be applied at the time of actuating when it is needed the most.

As shown in FIGS. 2 and 3, above the flanges 72 and 74 and forwardly thereof, in FIG. 1, are surfaces 94 and 96 upon which lever member 78 rests in the inoperative position, FIG. 1, when it has been pivoted forwardly from the operative position on the hinge bearing 80. It is in this position that the lever rides during normal travel and it is positioned to be out of the way of the passenger's foot pad 16 which is adapted to be moved downwardly 90° to a horizontal position extending above the lever.

Thus, when it is desired to position the motorcycle on the center stand 22, the lever member 78 is pivoted upwardly and rearwardly, FIG. 1, in phantom outline, so that the thickening pad rests on the top of the pad 18 to position the lever member 78 at about 62° with the horizontal. The operator then places his foot on the serrated surface 84 pushing against the force of the spring 50 to move the center stand arm 20 downwardly toward a horizontal position, and to move the legs 42 and 44 to a rearwardly-vertical position from which, by further pressure on the lever, the motorcycle is raised on the pads 46 and 48 so that the legs are moved past the pivot center to a forwardly-vertical position, FIG. 4, on which the motorcycle is securely vertically supported. During the operation, the motorcycle is steadied by the operator and a slight upward lift with his hands may be required to move the legs to their forward position. However, the lift required is very insignificant compared to that required without the present invention. The lever member approximately doubles the leverage applied in comparison to that applied to the pad 18 without it.

In other motorcycles with slightly different arrangements, the position, as shown in FIG. 1 of the lever member, in addition to allowing space for the passenger's foot rest, does not preclude space for gear such as saddle bags or other attachments carried on the rear end of the motorcycle in the vicinity of the pad 18.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:

1. In a motorcycle having a main frame,
   a center stand pivotally secured to a portion of said frame,
   said stand having spaced legs adapted to support the motorcycle on lower ends thereof in an at rest position,
   upper end portions of said legs connected to pivot mounting means, said stand being normally spring biased on said pivot mounting in an upwardly nonfunctional position,
   a side arm on said stand extending laterally outwardly of said frame and motorcycle positioned in the non-functional position to be moved downwardly against the force of the spring to a rearwardly-vertical position and then past the pivot center to a forwardly-vertical position against the weight of the motorcycle to raise the motorcycle to a steady at rest position with the lower ends of the stand legs on the ground surface under the motorcycle, means on said side arm adjacent its outer end on which said force is to be applied to move the arm and stand to the at rest position, the improvement comprising:

a lever securable to said arm adjacent its outer end by which substantially additional force can be applied to said last means by contact thereagainst and to said arm to move said stand past the pivot center to the at rest position, said lever being securable to said arm by arm engaging means, said lever being hingedly connected with said arm engaging means so as to be movable from a non-functional, out of the way position to an operating position to receive said force.

2. The invention according to claim 1 in which:

said lever is elongated and substantially thickened in the area of contact with said means so as to position the lever at an increased angle with the horizontal with respect to the ground surface.

3. The invention according to claim 2 in which: said angle is of the order of 62°.

4. The invention according to claim 1 in which:

said arm engaging means is a clamping member, said lever having a hinge at a forward end thereof by which it is hingedly connected to said member, said lever being pivotal on said hinge from a forward non-functional, out of the way position to said operating position to receive said force, a forward extension on said member to support said lever in the non-functional position, said means on said side arm being a foot pad adapted to receive said lever in said contact thereagainst in said operating position, said lever extending a substantial distance beyond said pad to increase the leverage on said stand to easily move said stand from the rearwardly-vertical position to the forwardly-vertical position, said lever being elongated and substantially thickened on its underside in the area of said contact with said pad so as to position the lever at an increased angle with the horizontal with respect to the ground surface, said lever being of sufficient length from the hinged forward end to the rearward end so that when a foot force on it moves the stand legs past the pivot center of the stand said rearward end makes moving contact with the ground surface, and a roller on said rearward end to roll on the ground surface to prevent wear on said rearward end and to prevent the rearward end from digging into and catching on the ground surface.

5. In a motorcycle having a main frame, a center stand pivotally secured to a portion of said frame, said stand having spaced legs adapted to support the motorcycle on lower ends thereof in an at rest position, upper end portions of said legs connected to pivot mounting means, said stand being normally spring biased on said pivot mounting in an upwardly non-functional position, a side arm on said stand extending laterally outwardly of said frame and motorcycle positioned in the non-functional position to be moved downwardly against the force of the spring to a rearwardly-vertical position and then past the pivot center to a forwardly-vertical position against the weight of the motocycle to raise the motorcycle to a steady at rest position with the lower ends of the stand legs on the ground surface under the motorcycle, means on said side arm adjacent its outer end on which said force is to be applied to move the arm and stand to the at rest position, the improvement comprising:

a lever securable to said arm adjacent its outer end by which substantially additional force can be applied to said last means and said arm to move said stand past the pivot center to the at rest position, a clamping member being adapted to secure said lever to said arm, said lever having a hinge at one end forwardly thereof by which it is hingedly engaged to an upwardly extending portion of said member, said lever being pivotal on said hinge from a non-functional, out of the way position to an operating position to receive said force, and an extension on said member to support said lever in the non-functional position, said means on said side arm being adapted to be contacted by and to support said lever in said operating position, said lever extending a substantial distance beyond said last means to increase the leverage on said stand to easily move said stand from the rearwardly-vertical position to the forwardly-vertical position.

6. The invention according to claim 5 in which:

said lever is bearing mounted in said hinge.

7. The invention according to claim 5 in which:

said lever is of sufficient length from the hinged one end to the other and rearward end so that when force on it moves the stand legs past the pivot center said rearward end makes moving contact with the ground surface.

8. The invention according to claim 7 including:

a roller on said rearward end to roll on the ground surface to prevent wear on said rearward end and to prevent the rearward end from digging into and catching on the ground surface.

9. The invention according to claim 8 in which:

said lever has an upper generally rectangular, serrated surface.

* * * * *